T. MARCUS
Potato-Planter.
No. 44,103. Patented Sept. 6. 1864.
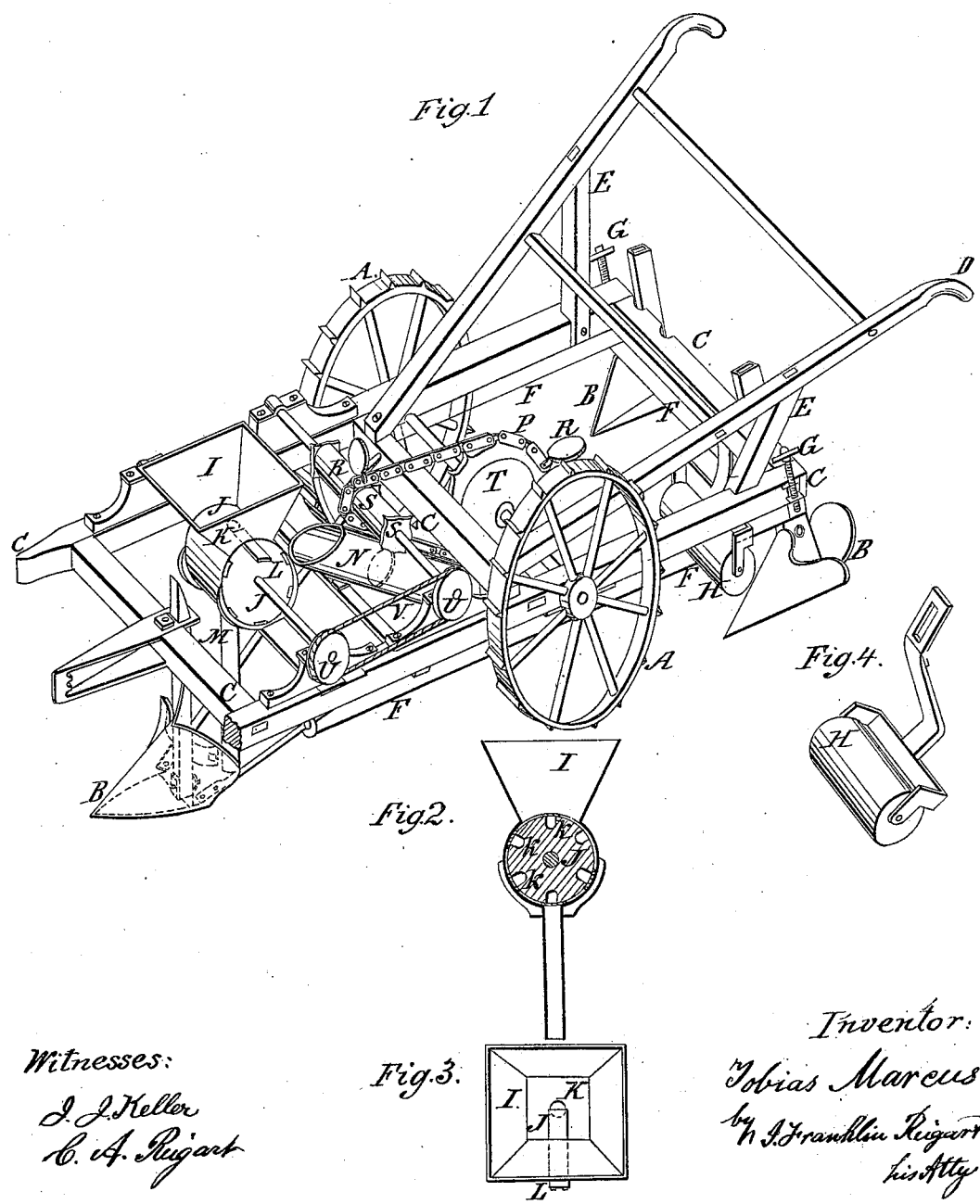
Witnesses:
J. J. Keller
C. A. Rugart
Inventor:
Tobias Marcus.
by H. J. Franklin Rugart
his Atty

UNITED STATES PATENT OFFICE.

TOBIAS MARCUS, OF WASHINGTON, DISTRICT OF COLUMBIA.

MACHINE FOR PLANTING POTATOES.

Specification forming part of Letters Patent No. 44,103, dated September 6, 1864.

*To all whom it may concern:*

Be it known that I, TOBIAS MARCUS, of the city of Washington, District of Columbia, have invented a new and Improved Machine for Plowing and Planting Potatoes, Sugar-Cane, Corn, and Cotton-Seed; and I do hereby declare that the following is a full and exact description thereof, reference being had to the accompanying drawings and letters of reference marked thereon, making a part of this specification.

The nature of my invention consists in the arrangement and combination of the seeding devices as arranged upon an adjustable carriage-frame, with plows and roller attached.

Figure 1 represents a perspective view of the machine; Fig. 2, a side elevation of the hopper and seeding-cylinder; Fig. 3, a top view of the hopper; Fig. 4, a view of the roller attached to the back part of the machine.

A represents the flanged carriage-wheels; B, the plows, one in front attached to the center of the front part of the square frame C and the other two at the back corners of the frame C, one near each corner; D, the handles at top, and fastened upon a cross-piece across the center of the frame C and resting upon two upright posts, E, near the rear of the frame, that the front part and rear of the frame can be raised or lowered during the plowing, so as to conform to the unevenness of the ground, while the adjustable part F of the frame is regulated by two set-screws, G, at the rear corners to regulate the depth of furrow, and the roller H, attached behind, to roll the ground and cover over the seed.

I is a square hopper, containing the seed or grain to be sown; J, the cylinder, with apertures K, that are regulated by slides L, to be closed or opened according to the quantity and size of the seed or grain. The finer or smaller grain falls through the straight tube M, and the potatoes, cotton-seed, or sugar-cane is carried through the large incline tube N.

When I desire to plant potatoes, cotton-seed, or sugar-cane, I attach an ordinary large square hopper across the frame C by screws, in the place of the small hopper I and cylinder J, and I use one or more incline tubes N and endless chain P. This incline tube N has a long slit in it the whole length of the tube, in which the endless chain P, with its round feeders R, operates, the chain P operating on a toothed cylinder, S, and is propelled by a main toothed wheel, T, that is located upon and moves with the axle of the carriage-wheels A. The round shovels or feeders R are fastened on the endless chain P at equidistances apart and pass down through the tube N, pressing down the cotton-seed or sugar-cane regularly and effectively into the furrow underneath. I have also pulley-wheels U, attached to the axles of the seeding-cylinder J, and the toothed cylinder S, connected by a strap, V, to operate the seeding-cylinder J, and endless chain P, to be able to sow or plant two kinds of seed or grain at the same time, if required.

What I claim as my invention, and desire to secure by Letters Patent, is—

The arrangement and combination of the seeding and planting devices I, J, M, N, P, R, S, and T, as arranged and combined with an adjustable frame, C and F, with plows and roller attached, as herein described, and for the purposes set forth.

TOBIAS MARCUS.

Witnesses:
J. FRANKLIN REIGART,
JOHN S. HOLLINGSHEAD.